United States Patent [19]
Yook

[11] Patent Number: 5,939,176
[45] Date of Patent: Aug. 17, 1999

[54] WARP LOOP SEAM

[75] Inventor: Steven S. Yook, So. Glens Falls, N.Y.

[73] Assignee: Albany International Corp., Albany, N.Y.

[21] Appl. No.: 09/144,771

[22] Filed: Sep. 1, 1998

[51] Int. Cl.$^6$ ..................................................... B32B 23/02
[52] U.S. Cl. ........................ 428/193; 428/121; 442/270; 442/271; 162/358.2; 162/900; 28/110; 139/383 A; 139/383 AA
[58] Field of Search ..................................... 428/193, 121; 442/270, 271; 162/358.2, 900; 28/110; 139/383 A, 383 AA

[56] References Cited

U.S. PATENT DOCUMENTS

| | | | |
|---|---|---|---|
| 4,695,498 | 9/1987 | Sarrazin et al. | 428/121 |
| 4,896,702 | 1/1990 | Crook | 139/383 A |
| 5,110,672 | 5/1992 | Zehle et al. | 428/234 |
| 5,360,656 | 11/1994 | Rexfelt et al. | 428/193 |

FOREIGN PATENT DOCUMENTS

WO 97/20105  6/1997  WIPO ............................... D21F 7/10

*Primary Examiner*—Christopher Raimund
*Attorney, Agent, or Firm*—Kane, Dalsimer, Sullivan, Kurucz, Levy, Eisele and Richard, LLP

[57] ABSTRACT

An on-machine-seamable multi-axial press fabric for the press section of a paper machine is made from a base fabric layer assembled by spirally winding a fabric strip in a plurality of contiguous turns, each of which abuts against and is attached to those adjacent thereto. The resulting endless base fabric layer is flattened to produce first and second fabric plies joined to one another at folds at their widthwise edges. Crosswise yarns are removed from each turn of the fabric strip at the folds at the widthwise edges to produce seaming loops. The first and second fabric plies are laminated to one another by needling staple fiber batt material therethrough. The press fabric is joined into endless form during installation on a paper machine by directing a pintle through the passage formed by the interdigitation of the seaming loops at the two widthwise edges.

10 Claims, 9 Drawing Sheets

WARP LOOP SEAM

BACKGROUND OF THE INVENTION

1. Field of the Invention

The present invention relates to the papermaking arts. More specifically, the present invention relates to press fabrics for the press section of a paper machine.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

The present invention relates specifically to the press fabrics used in the press section. Press fabrics play a critical role during the paper manufacturing process. One of their functions, as implied above, is to support and to carry the paper product being manufactured through the press nips.

Press fabrics also participate in the finishing of the surface of the paper sheet. That is, press fabrics are designed to have smooth surfaces and uniformly resilient structures, so that, in the course of passing through the press nips, a smooth, mark-free surface is imparted to the paper.

Perhaps most importantly, the press fabrics accept the large quantities of water extracted from the wet paper in the press nip. In order to fill this function, there literally must be space, commonly referred to as void volume, within the press fabric for the water to go, and the fabric must have adequate permeability to water for its entire useful life. Finally, press fabrics must be able to prevent the water accepted from the wet paper from returning to and rewetting the paper upon exit from the press nip.

Contemporary press fabrics are produced in a wide variety of styles designed to meet the requirements of the paper machines on which they are installed for the paper grades being manufactured. Generally, they comprise a woven base fabric into which has been needled a batt of fine, nonwoven fibrous material. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a papermachine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing one base fabric within the endless loop formed by another, and by needling a staple fiber batt through both base fabrics to join them to one another. One or both woven base fabrics may be of the on-machine-seamable type.

In any event, the woven base fabrics are in the form of endless loops, or are seamable into such forms, having a specific length, measured longitudinally therearound, and a specific width, measured transversely thereacross. Because paper machine configurations vary widely, paper machine is clothing manufacturers are required to produce press fabrics, and other paper machine clothing, to the dimensions required to fit particular positions in the paper machines of their customers. Needless to say, this requirement makes it difficult to streamline the manufacturing process, as each press fabric must typically be made to order.

In response to this need to produce press fabrics in a variety of lengths and widths more quickly and efficiently, press fabrics have been produced in recent years using a spiral technique disclosed in commonly assigned U.S. Pat. No. 5,360,656 to Rexfelt et al., the teachings of which are incorporated herein by reference.

U.S. Pat. No. 5,360,656 shows a press fabric comprising a base fabric having one or more layers of staple fiber material needled thereinto. The base fabric comprises at least one layer composed of a spirally wound strip of woven fabric having a width which is smaller than the width of the base fabric. The base fabric is endless in the longitudinal, or machine, direction. Lengthwise threads of the spirally wound strip make an angle with the longitudinal direction of the press fabric. The strip of woven fabric may be flat-woven on a loom which is narrower than those typically used in the production of paper machine clothing.

The base fabric comprises a plurality of spirally wound and joined turns of the relatively narrow woven fabric strip. The fabric strip is woven from lengthwise (warp) and crosswise (filling) yarns. Adjacent turns of the spirally wound fabric strip may be abutted against one another, and the helically continuous seam so produced may be closed by sewing, stitching, melting or welding. Alternatively, adjacent longitudinal edge portions of adjoining spiral turns may be arranged overlappingly, so long as the edges have a reduced thickness, so as not to give rise to an increased thickness in the area of the overlap. Further, the spacing between lengthwise yarns may be increased at the edges of the strip, so that, when adjoining spiral turns are arranged overlappingly, there may be an unchanged spacing between lengthwise threads in the area of the overlap.

In any case, a woven base fabric, taking the form of an endless loop and having an inner surface, a longitudinal (machine) direction and a transverse (cross-machine)) direction, is the result. The lateral edges of the woven base fabric are then trimmed to render them parallel to its longitudinal (machine) direction. The angle between the machine direction of the woven base fabric and the helically continuous seam may be relatively small, that is, typically less than 10°. By the same token, the lengthwise (warp) yarns of the woven fabric strip make the same relatively small angle with the longitudinal (machine) direction of the woven base fabric. Similarly, the crosswise (filling) yarns of the woven fabric strip, being perpendicular to the lengthwise (warp) yarns, make the same relatively small angle with the transverse (cross-machine) direction of the woven base fabric. In short, neither the lengthwise (warp) nor the crosswise (filing) yarns of the woven fabric strip align with the longitudinal (machine) or transverse (cross-machine) directions of the woven base fabric.

In the method shown in U.S. Pat. No. 5,360,656, the woven fabric strip is wound around two parallel rolls to assemble the woven base fabric. It will be recognized that endless base fabrics in a variety of widths and lengths may be provided by spirally winding a relatively narrow piece of woven fabric strip around the two parallel rolls, the length of a particular endless base fabric being determined by the length of each spiral turn of the woven fabric strip, and the width being determined by the number of spiral turns of the woven fabric strip. The prior necessity of weaving complete base fabrics of specified lengths and widths to order may thereby be avoided. Instead, a loom as narrow as 20 inches (0.5 meters) could be used to produce a woven fabric strip, but, for reasons of practicality, a conventional textile loom having a width of from 40 to 60 inches (1.0 to 1.5 meters) may be preferred.

U.S. Pat. No. 5,360,656 also shows a press fabric comprising a base fabric having two layers, each composed of a spirally wound strip of woven fabric. Both layers take the form of an endless loop, one being inside the endless loop formed by the other. Preferably, the spirally wound strip of woven-fabric in one layer spirals in a direction opposite to that of the strip of woven fabric in the other layer. That is to say, more specifically, the spirally wound strip in one layer defines a right-handed spiral, while that in the other layer defines a left-handed spiral. In such a two-layer, laminated base fabric, the lengthwise (warp) yarns of the woven fabric strip in each of the two layers make relatively small angles with the longitudinal (machine) direction of the woven base fabric, and the lengthwise (warp) yarns of the woven fabric strip in one layer make an angle with the lengthwise (warp) yarns of the woven fabric strip in the other layer. Similarly, the crosswise (filling) yarns of the woven fabric strip in each of the two layers make relatively small angles with the transverse (cross-machine) direction of the woven base fabric, and the crosswise (filling) yarns of the woven fabric strip in one layer make an angle with the crosswise (filling) yarns of the woven fabric strip in the other layer. In short, neither the lengthwise (warp) nor the crosswise (filling) yarns of the woven fabric strip in either layer align with the longitudinal (machine) or transverse (cross-machine) directions of the base fabric. Further, neither the lengthwise (warp) nor the crosswise (filling) yarns of the woven fabric strip in either layer align with those of the other.

As a consequence, the base fabrics shown in U.S. Pat. No. 5,360,656 have no defined machine- or cross-machine-direction yarns. Instead, the yarn systems lie in directions at oblique angles to the machine and cross-machine directions. A press fabric having such a base fabric may be referred to as a multi-axial press fabric. Whereas the standard press fabrics of the prior art have three axes: one in the machine direction (MD), one in the cross-machine direction (CD), and one in the Z-direction, which is through the thickness of the fabric, a multi-axial press fabric has not only these three axes, but also has at least two more axes defined by the directions of the yarn systems in its spirally wound layer or layers. Moreover, there are multiple flow paths in the Z-direction of a multi-axial press fabric. As a consequence, a multi-axial press fabric has at least five axes. Because of its multi-axial structure, a multi-axial press fabric having more than one layer exhibits superior resistance to nesting and/or to collapse in response to compression in a press nip during the papermaking process as compared to one having base fabric layers whose yarn systems are parallel to one another.

Because multi-axial press fabrics of the foregoing type have heretofore been produced only in endless form, their use has been limited to press sections having cantilevered press rolls and other components, which permit an endless press fabric to be installed from the side of the press section. Nevertheless, their relative ease of manufacture and superior resistance to compaction have contributed to an increased interest and a growing need for a multi-axial press fabric which may be seamed into endless form during installation on a press section, thereby making such press fabric available for use on paper machines lacking cantilevered components. The present invention, an on-machine-seamable multi-axial press fabric, has been developed to meet this need.

SUMMARY OF THE INVENTION

Accordingly, the present invention is an on-machine-seamable multi-axial press fabric for the press section of a paper machine. The press fabric comprises a base fabric having a first fabric ply and a second fabric ply.

The base fabric is assembled from an endless base fabric layer, which comprises a fabric strip having a first lateral edge, a second lateral edge, a plurality of lengthwise yarns and a plurality of crosswise yarns. The fabric strip is spirally wound in a plurality of contiguous turns wherein said first lateral edge in a given turn of said first fabric strip abuts said second lateral edge of an adjacent turn. A helically continuous seam separating adjacent turns of the fabric strip is thereby formed. This seam is closed by abutting first and second lateral edges to one another. The result is a base fabric layer in the form of an endless loop having a machine direction, a cross-machine direction, an inner surface and an outer surface.

The endless base fabric layer is flattened to produce the first and second fabric plies. The plies are joined to one another at their two widthwise edges at the folds produced when the endless base fabric layer is flattened. At least one crosswise yarn in each turn of the fabric strip is removed from the fold at each widthwise edge of the flattened endless base fabric layer. This provides unbound sections of the lengthwise yarns of the fabric strip. The unbound sections are used as seaming loops to join the widthwise edges of the flattened base fabric layer to one another to form an endless loop.

Alternatively, instead of actually flattening the endless base fabric layer to produce folds, any two locations, separated by one half of the distance around the endless base fabric layer, may be marked, perhaps with a felt-tipped marker, with a band extending in the cross-machine direction across the endless base fabric layer, and at least one crosswise yarn from each turn of the fabric strip removed from the marked bands to provide the unbound sections of the lengthwise yarns of the fabric strip.

At least one layer of staple fiber batt material is needled into one of the first and second fabric plies and through the other of the first and second fabric plies to laminate the first and second fabric plies to one another.

The present invention will now be described in more complete detail with frequent reference being made to the figures identified below.

DETAILED DESCRIPTION OF THE PREFERRED EMBODIMENT

Figure 1:
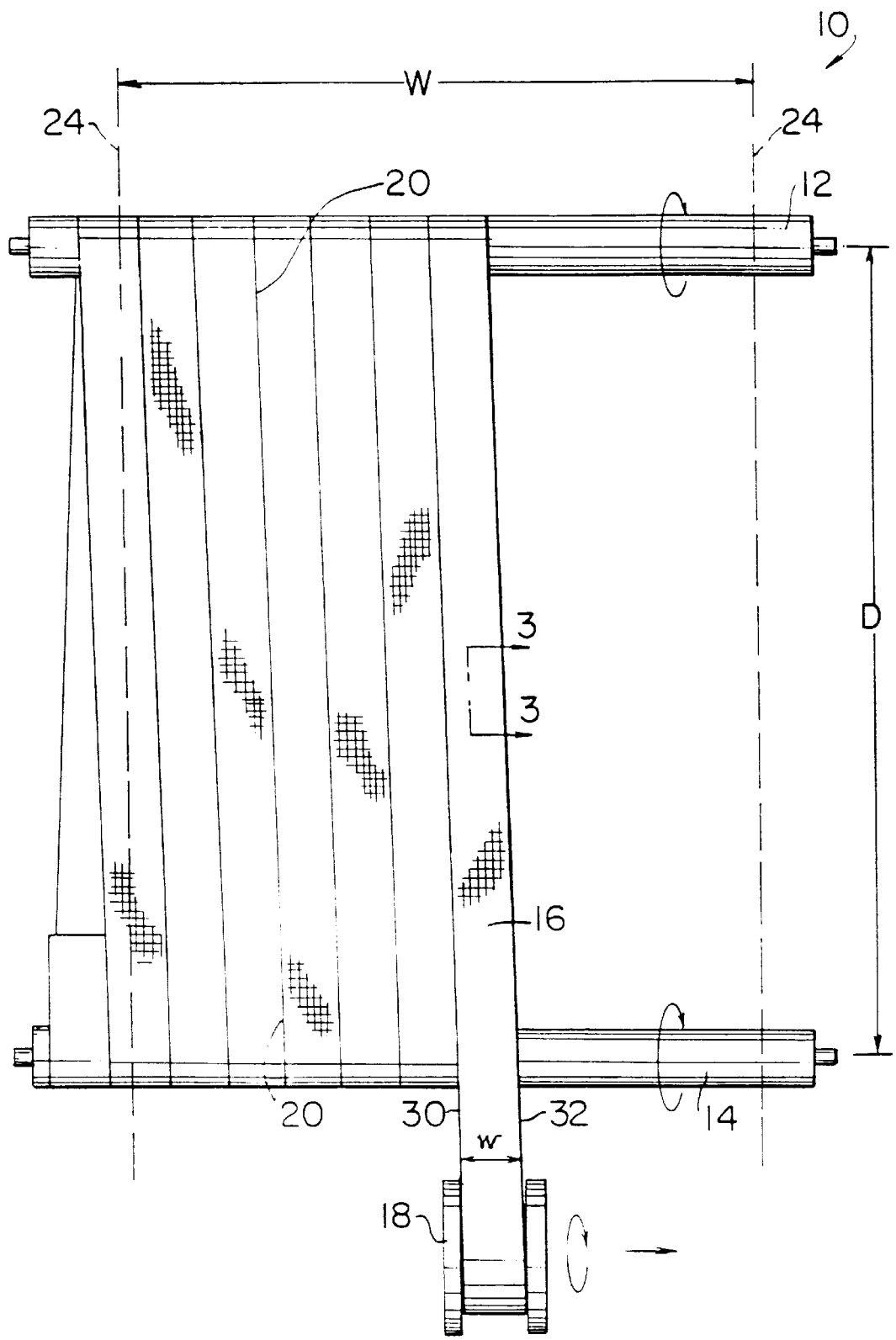
FIG. 1 is a schematic top plan view illustrating a method for manufacturing the base fabric layer of the on-machine-seamable multi-axial press fabric of the present invention.

Referring now to these figures, FIG. 1 is a schematic top plan view illustrating a method for manufacturing the base fabric layer of the on-machine-seamable multi-axial press fabric of the present invention. The method may be practiced using an apparatus 10 comprising a first roll 12 and a second roll 14, which are parallel to one another and which may be rotated in the directions indicated by the arrows. A woven fabric strip 16 is wound from a stock roll 18 around the first roll 12 and the second roll 14 in a continuous spiral. It will be recognized that it may be necessary to translate the stock roll 18 at a suitable rate along second roll 14 (to the right in FIG. 1) as the fabric strip 16 is being wound around the rolls 12,14.

Figure 2:
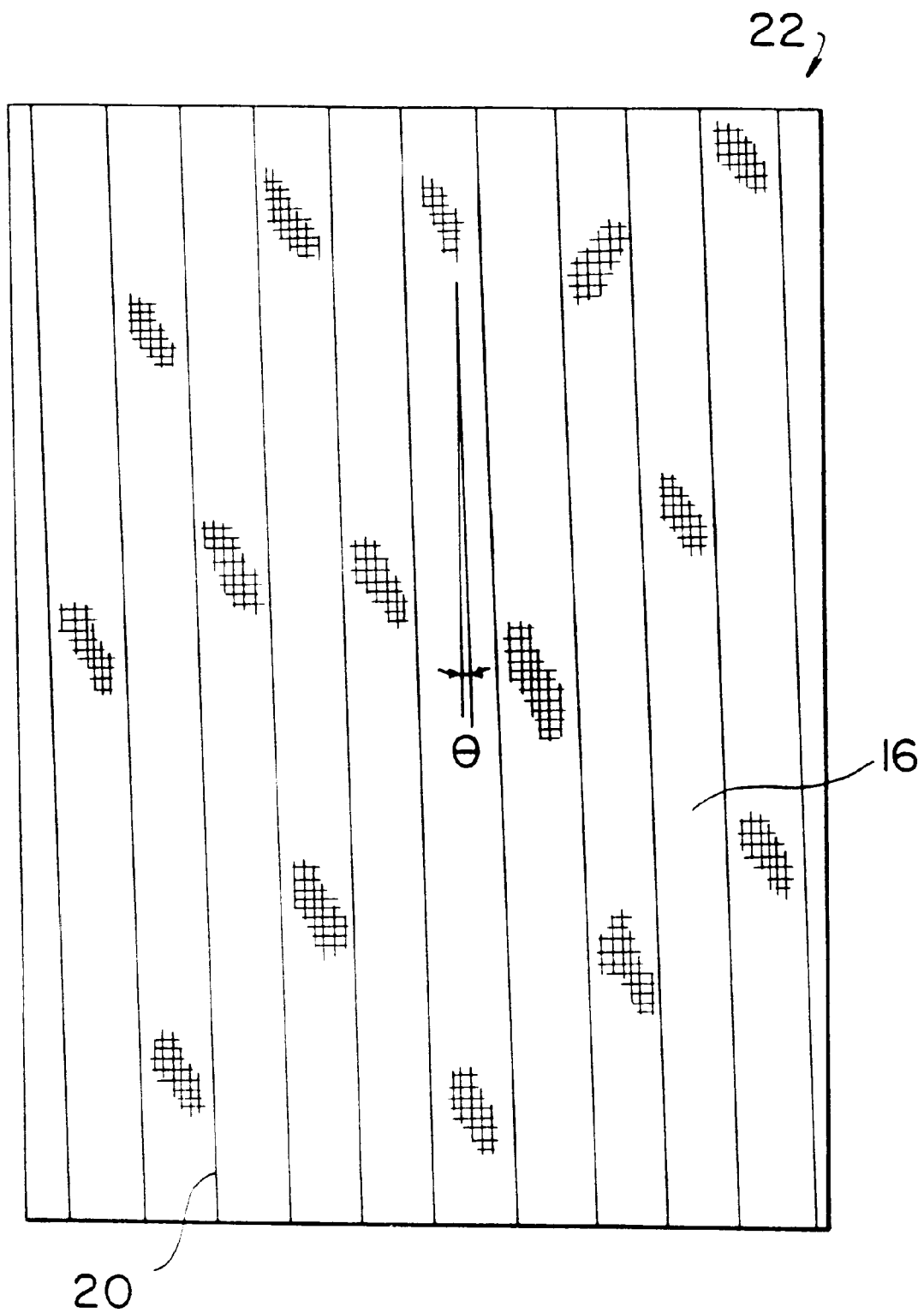
FIG. 2 is a top plan view of the finished base fabric layer.

The first roll 12 and the second roll 14 are separated by a distance D, which is determined with reference to the total length, C, required for the base fabric layer being manufactured, the total length, C, being measured longitudinally (in the machine direction) about the endless-loop form of the layer, it being understood that the total length, C, is twice the length of the on-machine-seamable multi-axial press fabric being manufactured. Woven fabric strip 16, having a width w, is spirally wound onto the first and second rolls 12,14 in a plurality of turns from stock roll 18, which may be translated along the second roll 14 in the course of the winding. Successive turns of the fabric strip 16 are abutted against one another and are attached to one another along helically continuous seam 20 by sewing, stitching, melting or welding to produce base fabric layer 22 as shown in FIG. 2. When a sufficient number of turns of the fabric strip 16 have been made to produce layer 22 in the desired width W, that width being measured transversely (in the cross-machine direction) across the endless-loop form of the layer 22, the spiral winding is concluded. The base fabric layer 22 so obtained has an inner surface, an outer surface, a machine direction and a cross-machine direction. Initially, the lateral edges of the base fabric layer 22, it will be apparent, will not be parallel to the machine direction thereof, and must be trimmed along lines 24 to provide the layer 22 with the desired width W, and with two lateral edges parallel to the machine direction of its endless-loop form.

Fabric strip 16 may be woven from monofilament, plied monofilament or multifilament yarns of a synthetic polymeric resin, such as polyester or polyamide, in the same manner as other fabrics used in the papermaking industry are woven. After weaving, it may be heat-set in a conventional manner prior to interim storage on stock roll 18. Fabric strip 16 includes lengthwise yarns and crosswise yarns, wherein, for example, the lengthwise yarns may be plied monofilament yarns while the crosswise yarns may be monofilament yarns. Further, fabric strip 16 may be of a single- or multi-layer weave.

Alternatively, fabric strip 16 may be woven and heat-set in a conventional manner, and fed directly to apparatus 10 from a heat-set unit without interim storage on a stock roll 18. It may also be possible to eliminate heat-setting with the proper material selection and product construction (weave, yarn sizes and counts).

Figure 3:
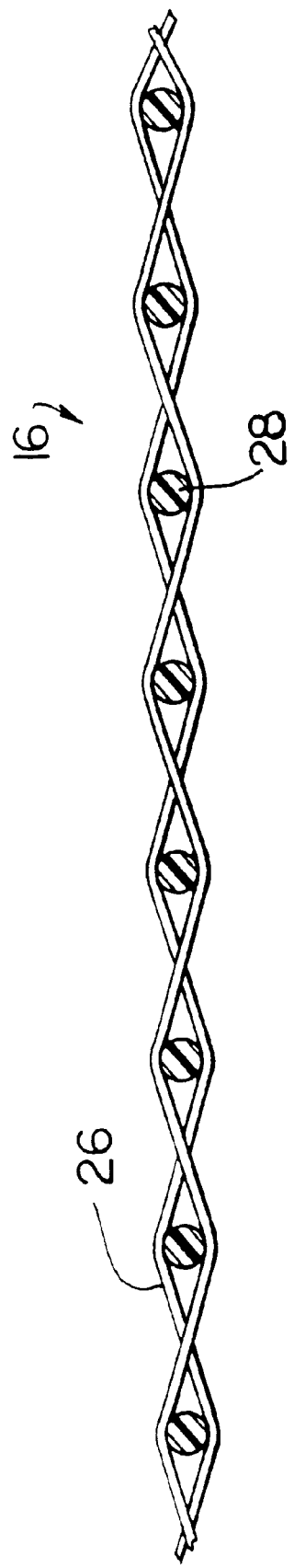
FIG. 3 is a cross-sectional view taken as indicated by line 3—3 in FIG. 1.

FIG. 3 is a cross section of fabric strip 16 taken as indicated by line 3—3 in FIG. 1. It comprises lengthwise yarns 26 and crosswise yarns 28, both of which are represented as monofilaments, interwoven in a single-layer weave. More specifically, a plain weave is shown, although, it should be understood, the fabric strip 16 may be woven according to any of the weave patterns commonly used to weave paper machine clothing. Because the fabric strip 16 is spirally wound to assemble base fabric layer 22, lengthwise yarns 26 and crosswise yarns 28 do not align with the machine and cross-machine directions, respectively, of the layer 22. Rather, the lengthwise yarns 26 make a slight angle, $\theta$, whose magnitude is a measure of the pitch of the spiral windings of the fabric strip 16, with respect to the machine direction of the layer 22, as suggested by the top plan view thereof shown in FIG. 2. This angle, as previously noted, is typically less than 10°. Because the crosswise yarns 28 of the fabric strip 16 generally cross the lengthwise yarns 26 at a 90° angle, the crosswise yarns 28 make the same slight angle, $\theta$, with respect to the cross-machine direction of the layer 22.

Woven fabric strip 16 has a first lateral edge 30 and a second lateral edge 32 which together define the width of the body of the woven fabric strip 16. As the fabric strip 16 is being spirally wound onto the first and second rolls 12, 14, the first lateral edge 30 of each turn is abutted against the second lateral edge 32 of the immediately preceding turn.

Once the base fabric layer 22 has been assembled, it may be heat-set prior to being removed from apparatus 10. After removal, it is flattened as shown in the plan view presented in FIG. 4. This places base fabric layer 22 into the form of a two-ply fabric of length, L, which is equal to one half of the total length, C, of the base fabric layer 22 as manufactured on apparatus 10, and width, W. Seam 20 between adjacent turns of woven fabric strip 16 slants in one direction in the topmost of the two plies, and in the opposite direction in the bottom ply, as suggested by the dashed lines in FIG. 4. Flattened base fabric layer 22 has two widthwise edges 36.

Figure 5:
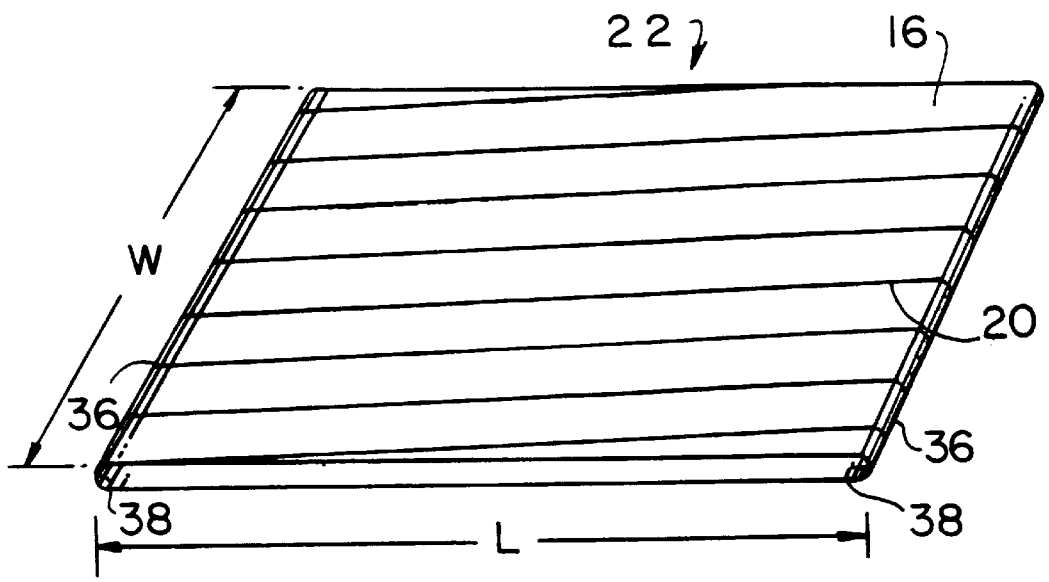
FIG. 5 is a perspective view of the base fabric layer as shown in FIG. 4.

FIG. 5 is a perspective view of the base fabric layer 22 in a flattened condition. At the two widthwise edges 36 of the flattened base fabric layer 22 are folds 38, which align with the transverse, or cross-machine, direction thereof.

Figure 4:
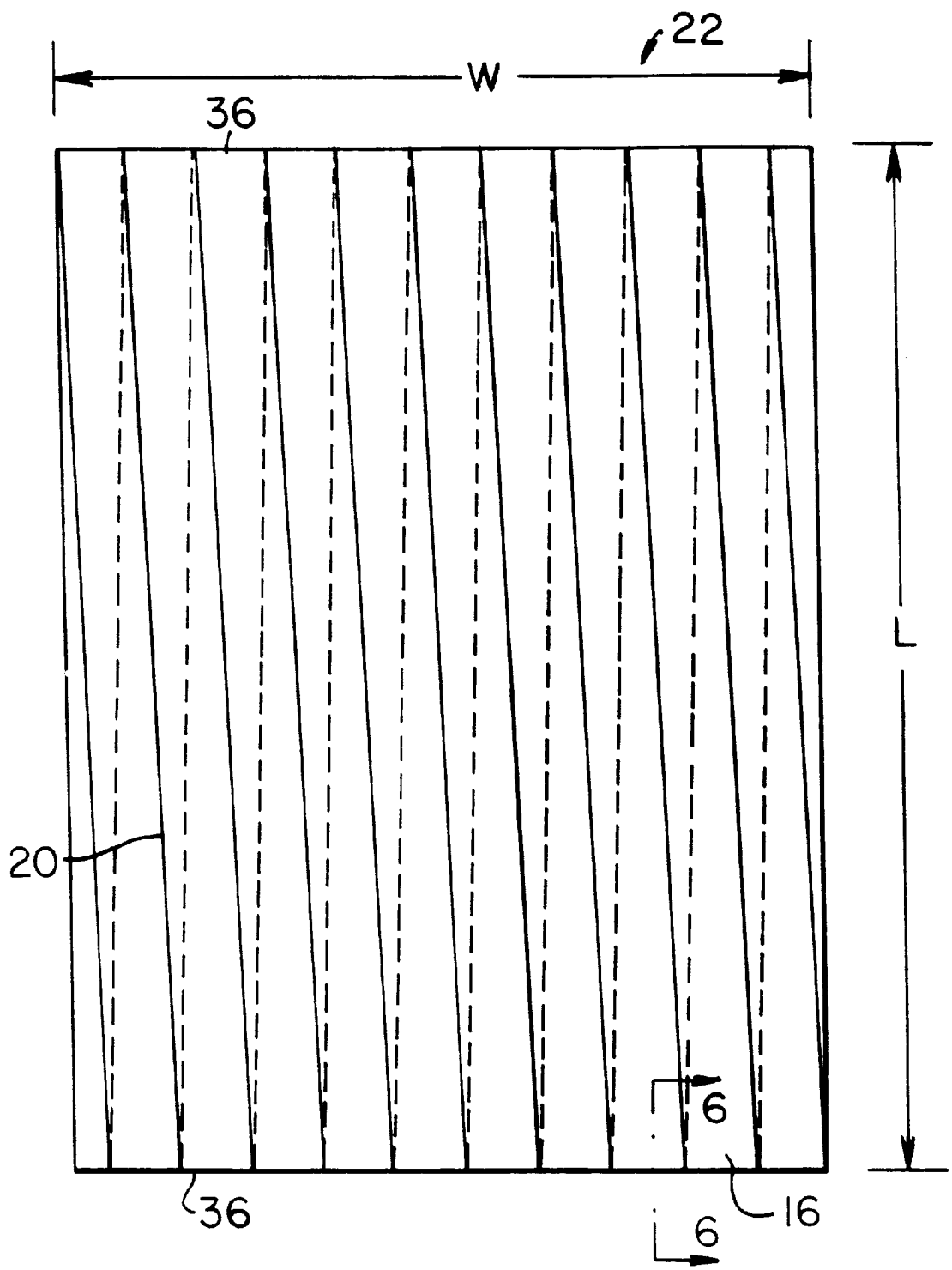
FIG. 4 is a top plan view of the base fabric layer in a flattened condition.
Figure 6:
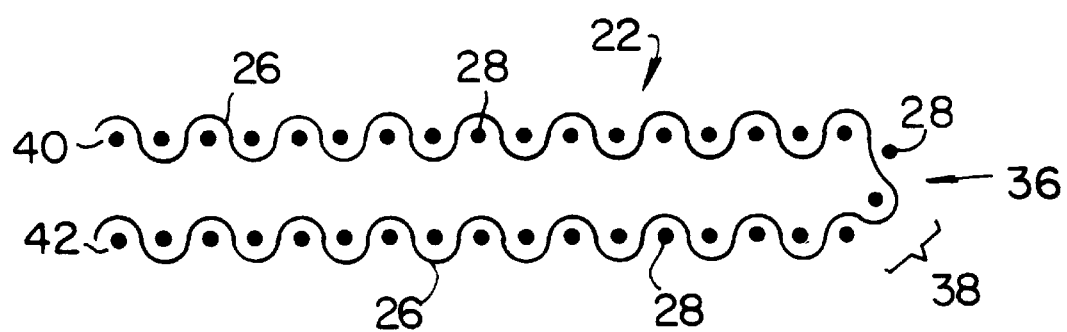
FIG. 6 is a schematic cross-sectional view of the flattened base fabric layer taken as indicated by line 6—6 in FIG. 4.

FIG. 6 is a schematic cross-sectional view taken as indicated by line 6—6 in FIG. 4. In accordance with the present invention, a plurality of crosswise yarns 28 of fabric strip 16 and of segments thereof are removed from adjacent the folds 38 to produce a first fabric ply 40 and a second fabric ply 42 joined to one another at their widthwise edges 36 by unbound sections of lengthwise yarns 26. These unbound sections of lengthwise yarns 26 ultimately form seaming loops for use in joining the papermaker's fabric to be produced from base fabric layer 22 into endless form during installation on a paper machine.

The provision of the unbound sections of lengthwise yarns 26 at the two widthwise edges 36 of the flattened base fabric layer 22 is complicated by two factors. Firstly, because the fabric strip 16 has a smaller width than the base fabric layer 22, its crosswise yarns 28 do not extend for the full width of the base fabric layer 22. Secondly, and more importantly, because the fabric strip 16 is spirally wound to produce base fabric layer 22, its crosswise yarns do not lie in the cross-machine direction of the base fabric layer 22 and therefore are not parallel to the folds 38. Instead, as discussed above, the crosswise yarns 28 make a slight angle, θ, typically less than 10°, with respect to the cross-machine direction of the base fabric layer 22. Accordingly, in order to provide the unbound sections of lengthwise yarns 26 at folds 38, crosswise yarns 28 must be removed in a stepwise fashion from the folds 38 across the width, W, of the base fabric layer 22.

Figure 7:
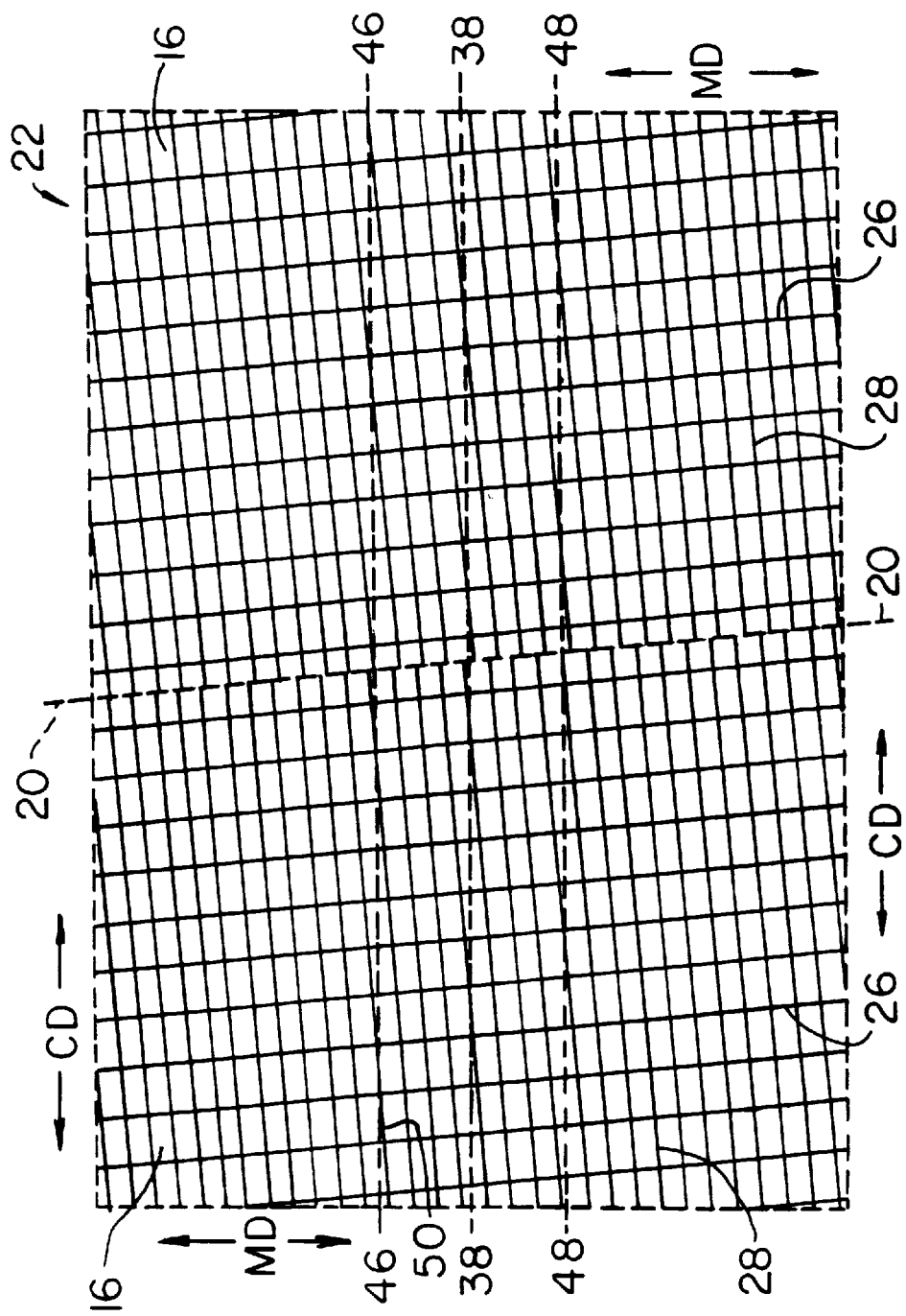
FIG. 7 is a plan view of a portion of the surface of the base fabric layer.

For purposes of illustration, FIG. 7 is a plan view of a portion of the surface of base fabric layer 22 at a point on one of the folds 38 near the spirally continuous seam 20 between two adjacent spiral turns of fabric strip 16. Lengthwise yarns 26 and crosswise yarns 28 are at slight angles with respect to the machine direction (MD) and cross-machine direction (CD), respectively.

The fold 38, which is flattened during the removal of the neighboring crosswise yarns 28, is represented by a dashed line in FIG. 7. In practice, the base fabric layer 22 would be flattened, as described above, and the folds 38 at its two widthwise edges 36 marked in some manner, so that its location would be clear when it was flattened. In order to provide the required unbound sections of lengthwise yarns 26 at the fold 38, it is necessary to remove the crosswise yarns 28 from a region, defined by dashed lines 46,48 equally separated from fold 38 on opposite sides thereof. Because crosswise yarns 28 are not parallel to fold 38 or dashed lines 46,48, it is often necessary to remove only a portion of a given crosswise yarn 28, such as in the case with crosswise yarn 50 in FIG. 7, in order to clear the space between dashed lines 46,48 of crosswise yarns 28.

Figure 8:
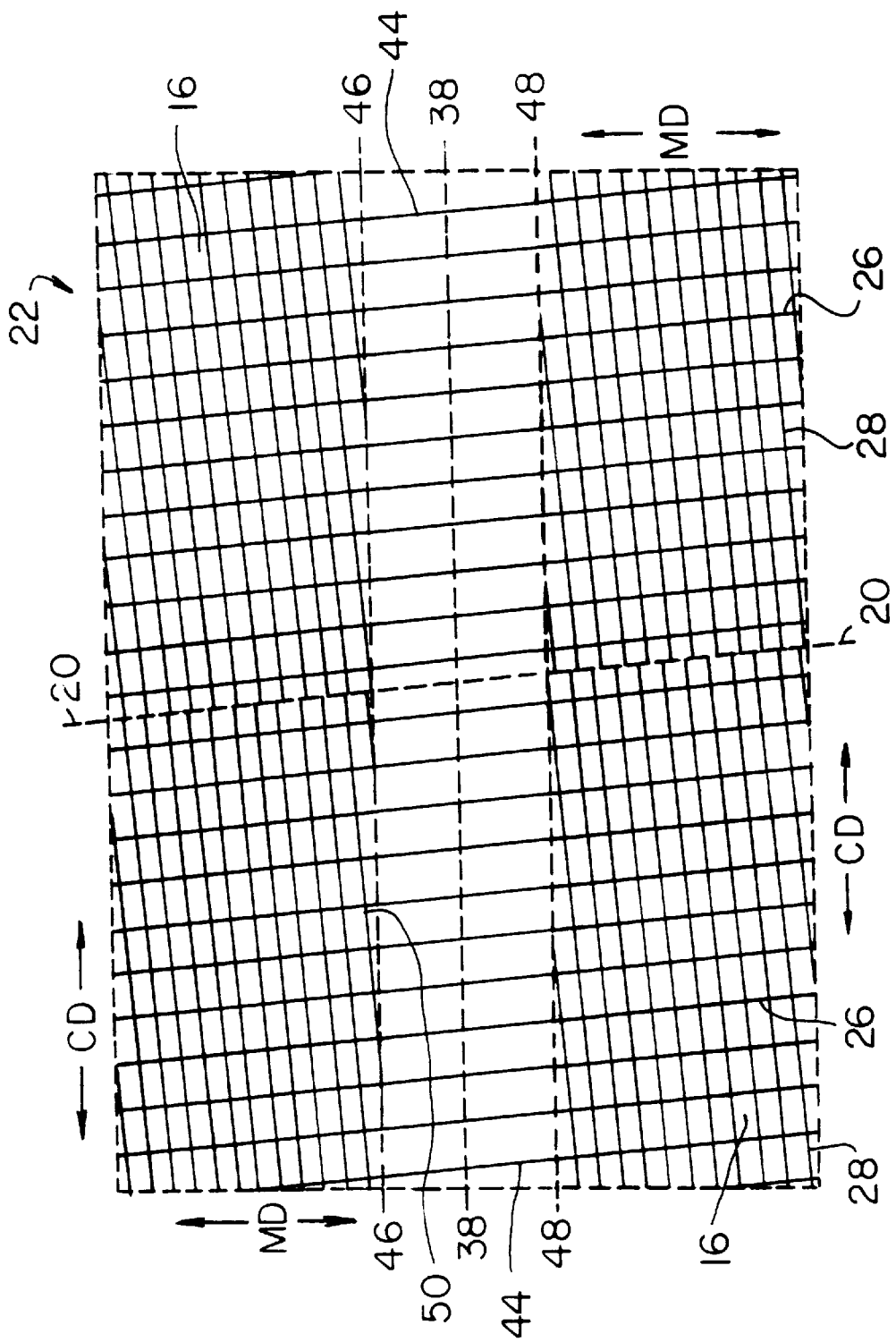
FIG. 8 is a plan view of the portion of the surface of the base fabric layer shown in FIG. 7 following the removal of some of its crosswise yarns.

FIG. 8 is a plan view of the same portion of the surface of base fabric layer 22 as is shown in FIG. 7 following the removal of the crosswise yarns 28 from the region centered about the fold 38. Unbound sections 44 of lengthwise yarns 26 extend between dashed lines 46,48 in the region of the fold 38. The portion of crosswise yarn 50 which extended past dashed line 46 has been removed, as noted above.

Figure 9:
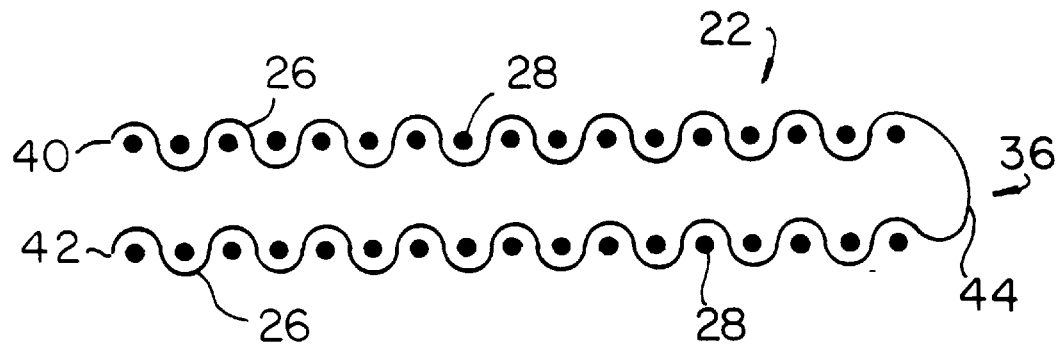
FIG. 9 is a schematic cross-sectional view, analogous to that provided in FIG. 6, following the removal of crosswise yarns.

Following the removal of the crosswise yarns 28 from the region centered about the fold 38, the base fabric layer 22 is again flattened so that first fabric ply 40 and second fabric ply 42 are joined to one another by unbound sections 44 of lengthwise yarns 26. FIG. 9 is a schematic cross-sectional view, analogous to that provided in FIG. 6, of one of the two widthwise edges 36 of the flattened base fabric layer 22.

Figure 10:
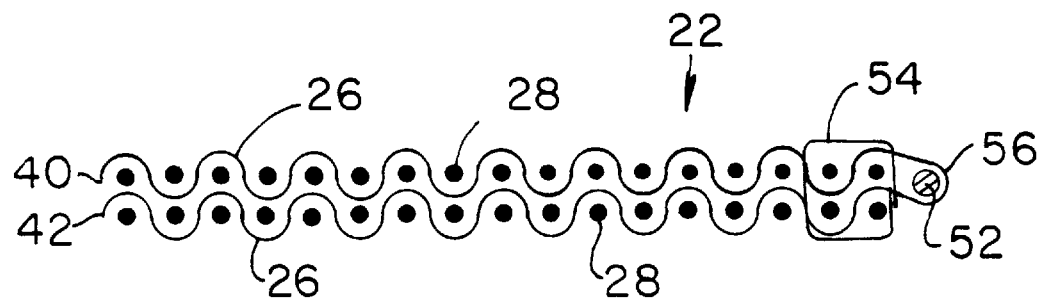
FIGS. 10, 11 and 12 are schematic cross-sectional views of subsequent steps in the manufacture of the on-machine-seamable multi-axial press fabric of the present invention.

Referring to FIG. 10, a loop-forming cable 52 is next installed between first fabric ply 40 and second fabric ply 42 and against unbound sections 44 of lengthwise yarns 26. Stitches 54, for example, may be made to connect first fabric ply 40 to second fabric ply 42 adjacent to loop-forming cable 52 to form seaming loops 56 from the unbound sections 44 of the lengthwise yarns 26. Alternatively, first fabric ply 40 may be connected to second fabric ply 42 adjacent to loop-forming cable 52 by any of the other means used for such a purpose by those or ordinary skill in the art.

Figure 11:
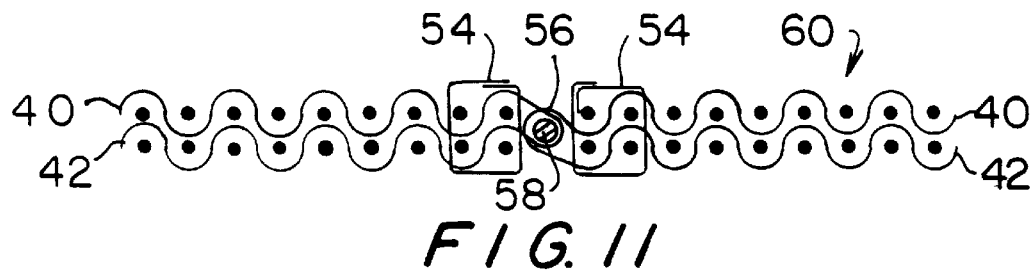
Figure 12:
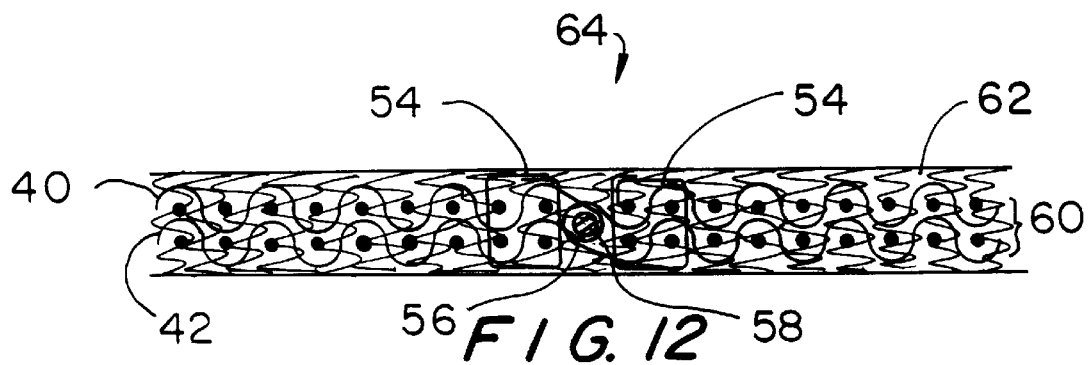

Loop-forming cable 52 is then removed and the seaming loops 56 formed in the foregoing manner at the two widthwise edges 36 of the flattened base fabric layer 22 are then interdigitated with one another in a manner well-known to those of ordinary skill in the art. As shown in FIG. 11, a pintle 58 is directed through the passage defined by the interdigitated seaming loops 56 to join the two widthwise edges 36 of the flattened base fabric layer 22 to one another, thereby forming a two-ply base fabric 60 for an on-machine-seamable multi-axial press fabric.

The two-ply base fabric 60 may, at this point, again be heat-set. In any event, one or more layers of staple fiber batt material 62 are needled into and through the superimposed first fabric ply 40 and second fabric ply 42 to join them to one another and to complete the manufacture of on-machine-seamable multi-axial press fabric 64. The staple fiber batt material 62 is of a polymeric resin material, and preferably is of a polyamide or polyester resin.

Finally, pintle 58 may be removed, and the staple fiber batt material 62 cut in the vicinity of seaming loops 56 to place press fabric 64 into open form for shipment to a paper mill and for subsequent installation there on a paper machine.

Modifications to the above would be obvious to one of ordinary skill in the art, but would not bring the invention so modified beyond the scope of the appended claims.

What is claimed is:

1. An on-machine-seamable multi-axial press fabric for the press section of a paper machine, said press fabric comprising:

a base fabric, said base fabric having a first fabric ply and a second fabric ply fashioned from an endless base fabric layer, said endless base fabric layer comprising a fabric strip having a first lateral edge, a second lateral edge, a plurality of lengthwise yarns and a plurality of crosswise yarns, said fabric strip being spirally wound in a plurality of contiguous turns wherein said first lateral edge in a given turn of said first fabric strip abuts said second lateral edge of an adjacent turn thereof, thereby forming a helically continuous seam separating adjacent turns of said fabric strip, said helically continuous seam being closed by attaching abutting first and second lateral edges of said fabric strip to one another, thereby providing said base fabric layer in the form of an endless loop having a machine direction, a cross-machine direction, an inner surface and an outer surface, said endless base fabric layer being flattened to produce said first fabric ply and said second fabric ply having two widthwise edges, said first fabric ply and said second fabric ply being connected to one another at folds along said two widthwise edges, at least one crosswise yarn in each of said turns of said fabric strip being removed at each of said folds at said two widthwise edges to provide unbound sections of lengthwise yarns of said fabric strip at said folds, said unbound sections being seaming loops for joining said widthwise edges of said flattened base fabric layer to one another to form an endless loop; and at least one layer of staple fiber batt material needled into one of said first and second fabric plies and through to the other of said first and second fabric plies to laminate said first and second fabric plies to one another.

2. An on-machine-seamable multi-axial press fabric as claimed in claim 1 wherein said fabric strip is woven from said lengthwise and crosswise yarns.

3. An on-machine-seamable multi-axial press fabric as claimed in claim 1 wherein said fabric strip is a single-layer weave.

4. An on-machine-seamable multi-axial press fabric as claimed in claim 1 wherein said fabric strip is of a multi-layer weave.

5. An on-machine-seamable multi-axial press fabric as claimed in claim 1 wherein said lengthwise yarns and said crosswise yarns of said fabric strip are of a synthetic polymeric resin.

6. An on-machine-seamable multi-axial press fabric as claimed in claim 1 wherein said base fabric layer has lateral edges trimmed in a direction parallel to said machine thereof.

7. An on-machine-seamable multi-axial press fabric as claimed in claim 1 wherein said fabric strip makes an angle of less than 10° with respect to said machine direction of said base fabric layer.

8. An on-machine-seamable multi-axial press fabric as claimed in claim 1 further comprising at least one layer of staple fiber batt material needled into the other of said first and second fabric plies.

9. An on-machine-seamable multi-axial press fabric as claimed in claim 1 wherein said staple fiber batt material is of a polymeric resin material.

10. An on-machine-seamable multi-axial press fabric as claimed in claim 9 wherein said polymeric resin material is selected from the group consisting of polyamide and polyester resins.

* * * * *